F. C. STUCKEL.
GRAIN SCREEN FOR THRESHING MACHINES.
APPLICATION FILED DEC. 3, 1914.
1,217,364.
Patented Feb. 27, 1917.
2 SHEETS—SHEET 1.
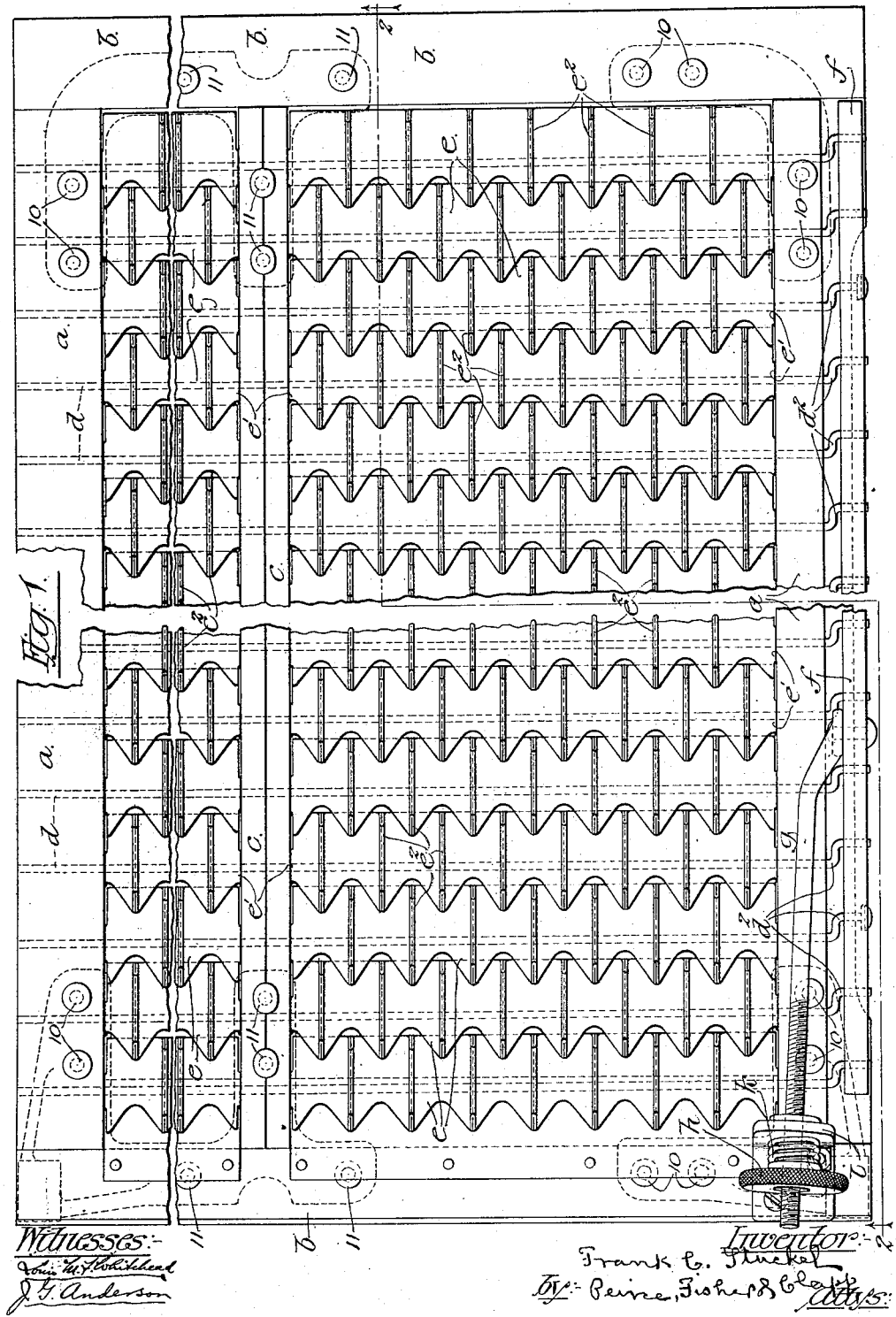

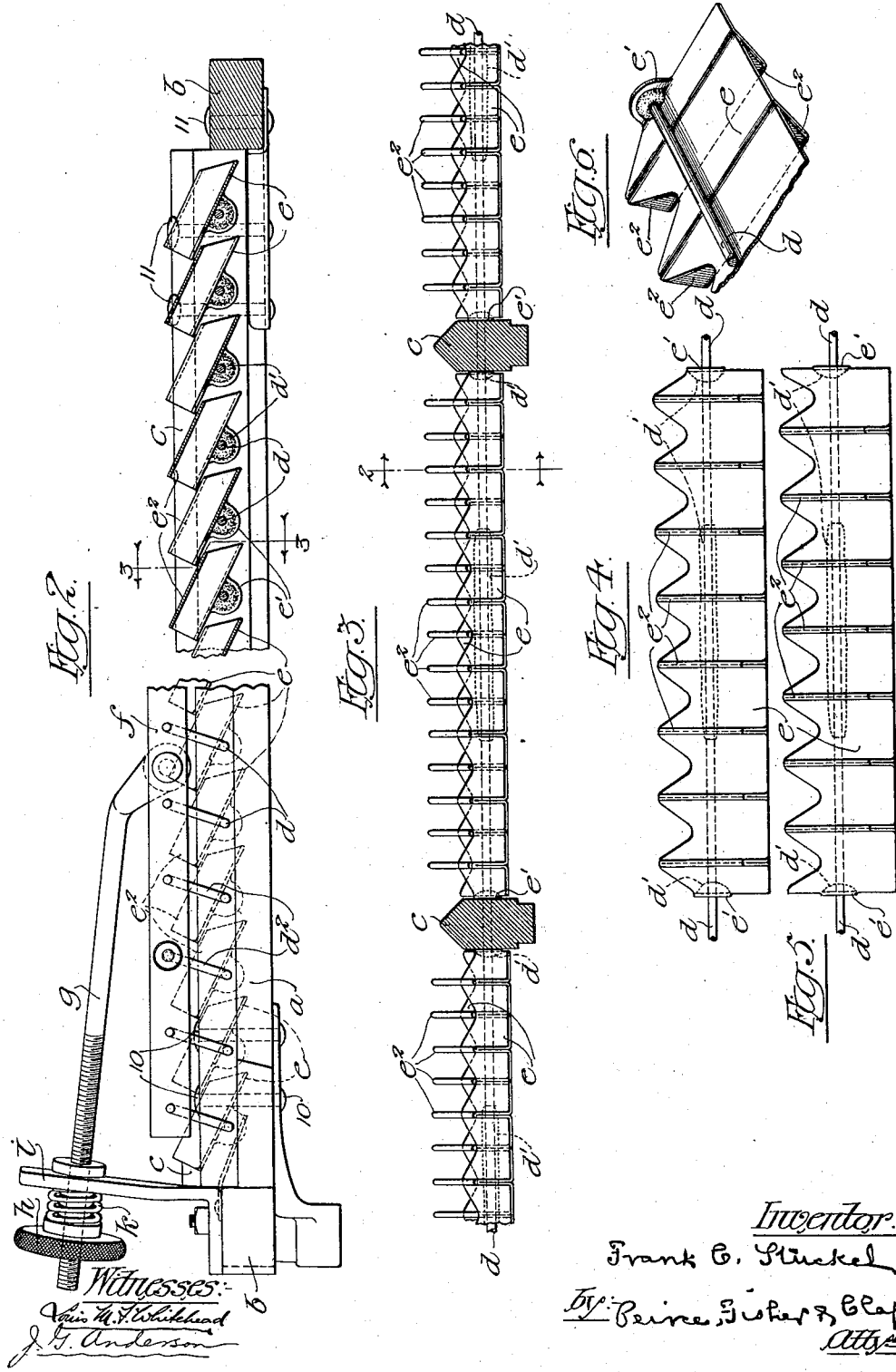

UNITED STATES PATENT OFFICE.

FRANK C. STUCKEL, OF RACINE, WISCONSIN, ASSIGNOR TO J. I. CASE THRESHING MACHINE COMPANY, OF RACINE, WISCONSIN, A CORPORATION.

GRAIN-SCREEN FOR THRESHING-MACHINES.

1,217,364.     Specification of Letters Patent.     Patented Feb. 27, 1917.

Application filed December 3, 1914. Serial No. 875,214.

*To all whom it may concern:*

Be it known that I, FRANK C. STUCKEL, a citizen of the United States, and a resident of Racine, in the county of Racine and State of Wisconsin, have invented certain new and useful Improvements in Grain-Screens for Threshing-Machines, of which I do hereby declare the following to be a full, clear, and exact description.

The invention relates to sieves or chaffers for screening grain and pertains to devices of the adjustable type meant for ready adaptation to seed of different sorts or conditions so that a clean separation from straws, sticks, chaff or other admixed coarse stuff may occur after quick exit from the threshing cylinder.

The improved screen is of the familiar kind, involving rows of slats mounted in separate sections on the main supporting frame, each set of slats along the same transverse rock-rod being carried pivotally in the frame under unison control of the operating bar common to all of the rods for nice simultaneous adjustment of the mesh throughout the screen surface, as desired.

The invention pertains specifically to the particular structure of the tilting slats in combination to effectually isolate the seed in the channel-ways through aid of the underblast while the coarse or lighter refuse floats across and asunder, sustained above on the upright ribs, offset from row to row, in diagonal definition of the several channel ways.

Figure 1 is a view of the screen in fragmentary plan with slats partly open, as seen at Fig. 2. Fig. 2 is a sectional view, partly in elevation on zig-zag line 2—2, Fig. 1 with slats opened somewhat as for oats. Fig. 3 is a view in cross section as at line 3—3, Fig. 2. Fig. 4 is a plan view of a single slat on its rock rod, detached. Fig. 5 like view of the companion slat next ahead on the frame but slightly withdrawn to show interspace reëntrant points against straight edge of the slat just in rear. Fig. 6 perspective of a slat fragment overturned, showing the swaged fin seams and the rock rod flat against the under side of the slat.

In the form shown, the rectangular frame consists of side bars $a$ and end bars $b$ jointed together with flat corner-irons secured by rivets 10 at the junctions to promote rigidity. The tie bars $c$ extend at intervals between the end bars $b$ to which they are tenoned while flat T-irons fastened in place by rivets 11 serve to stiffen the joints.

The tie-bars $c$ run lengthwise of the screen-frame in relation parallel with side bars $a$, all alike being bored through at definite intervals to afford pivot seats for the rock-rods $d$ ranging across the frame to carry the sets of slats strung thereon and fastened in place by solder or other expedient, as at $d'$.

There is a single slat $e$ for each of the screen sections defined by the several tie-bars $c$, the slats being duplicate or symmetric shapes of galvanized iron, stamped out with ear mounts $e'$ to afford pivot seats at opposite ends of the slat which also has a serrated or reëntrant edge at one margin and a straight edge at the other while the slat is swaged or folded cross-wise in a series of upright fins $e^2$ extending in parallel from the tooth points at one side to the plain edge at the other.

The upright fins $e^2$ constitute channel ways below for the heavier kernels, chaff, burs or other short stuff while the coarser straws, sticks, stubble, etc., travel above under successive shakes or impulses and proceed from inlet to exit across the screen surface, floating upon the backs of the fins $e^2$, under sustaining influence of the air-blast projected from beneath until finally, dis-entangled from the refuse, the grains thereupon fall out beneath at some of the slat mesh vents suited for their passage.

The slats range in successive rows or series lengthwise of the screen, the reëntrant back edge of each slat of the set along any given rock rod being made to overlie the plain front margin of the fellow slat in the row next behind, the upright fins $e^2$ of the slat being disalined or offset from row to row so that the fine stuff, kernels, chaff, etc., tend to travel cross-wise from slat to slat along diagonal channels defined by the uprights $e^2$ which latter are cut away at front to insure better clearance as the slat ahead rocks down.

The overlay of the slats in rows can be adjustably varied at will to fix the mesh and as well to govern the insweep of the air current evenly across the channels by hanging an operating bar $f$ upon the symmetric cranks $d^2$ projecting at the side of the frame from the terminals of the several rock-rods $d$.

The shift of the unison bar $f$ is controlled by a threaded arm $g$ extending there-from through the sleeve of a set-nut $h$ loosely carried in an eye of the projecting bracket $i$ at the lower corner of the screen frame. A stout coil-spring $k$ encircles the sleeve between the head of the nut and the bracket to take up slack or lost motion.

Once the mesh is properly adjusted, the rows of slats stay set while the straws, sticks or other coarse refuse, travel across the upright fins while the chaff, short joints and kernels travel beneath, the coarse stuff tending always to become farther and farther dispartate. The grains rattle out and settle down next the slats, finally dropping off under successive shaking impulses of the screen despite the air current streaming counter through the mesh.

The rock rods $d$ bear snugly against the flat faces of the slats they sustain, making a tight fit throughout their length to prevent the lodging of barley or wheat beards or the like that often accumulate and tend to obstruct the nicety of adjustment, as would be apt to ensue were the rock rod in open contact with the slat bottom crowns as in the older corrugated forms.

Manifestly, the right-line or upright character of the fins makes for definite clearance, a benefit still further aided by the alternate offset course of the channel ways that tend to spread the float straws asunder as the charge progresses across the screen from inlet to exit.

Obviously the details of structure can be varied according to the mechanic's skill without departure from the essentials of the invention.

Having thus described my invention, what I claim as new, and desire to secure by Letters Patent, is:

1. For threshing machines, an adjustable grain screen made up of multiple rows of plane slats strung in sets along parallel rock rods pivotally carried for unison tilt on the main frame, each slat having a straight edge at front and a reëntrant or serrated edge at rear with upright ribs or fins extended at the distal points from edge to edge between but offset for successive slats which latter besides, are mounted in overlap relation to define the mesh while channel ways for kernels and finer refuse extend offset across the screen from front to rear between successive ribs thus disparting the fine stuff below from the coarse above, afloat upon the rib tops, substantially as described.

2. For threshing machines, an adjustable grain screen made up of multiple rows of plane slats strung in sets along parallel rock rods pivotally carried for unison tilt on the main frame, each slat having a straight edge at front and a reëntrant or serrated edge at rear with upright ribs or fins abruptly sloped to the straight edge, said ribs extending at the distal points from edge to edge between but offset for successive slats which latter besides, are mounted in overlap relation to define the mesh while channel ways for kernels and finer refuse extend offset across the screen from front to rear between successive ribs thus separating the fine stuff below from the coarse above, afloat upon the rib tops, substantially as described.

3. For threshing machines, an adjustable screen made up of separate slats symmetrically mounted upon parallel rock rods pivoting for unison tilt at the main frame each slat being flat and formed with serrations at one edge but straight at the opposite and with upright fins offset across at the distal points between to dispart the traveling stuff, the reëntrant edge of any given slat overlapping the straight edge of its neighbor to determine the screen mesh and thereby to govern the blast.

4. In adjustable screens for threshing machines a set of separate slats suited for symmetric mount upon parallel rock rods pivotally carried to tilt in common on the main frame, each slat comprising a flat strip serrated at one edge but straight at the opposite and having upright fins extended crosswise at the distal points but with front end abruptly sloping for clearance in adjustment of the neighbor slat.

FRANK C. STUCKEL.

Witnesses:
WALLACE F. MACGREGOR,
ALBERT B. WELTY.

Copies of this patent may be obtained for five cents each, by addressing the "Commissioner of Patents, Washington, D. C."